(No Model.)
P. BRICKMAN.
FEED WATER HEATER AND FILTER.
No. 329,265. Patented Oct. 27, 1885.
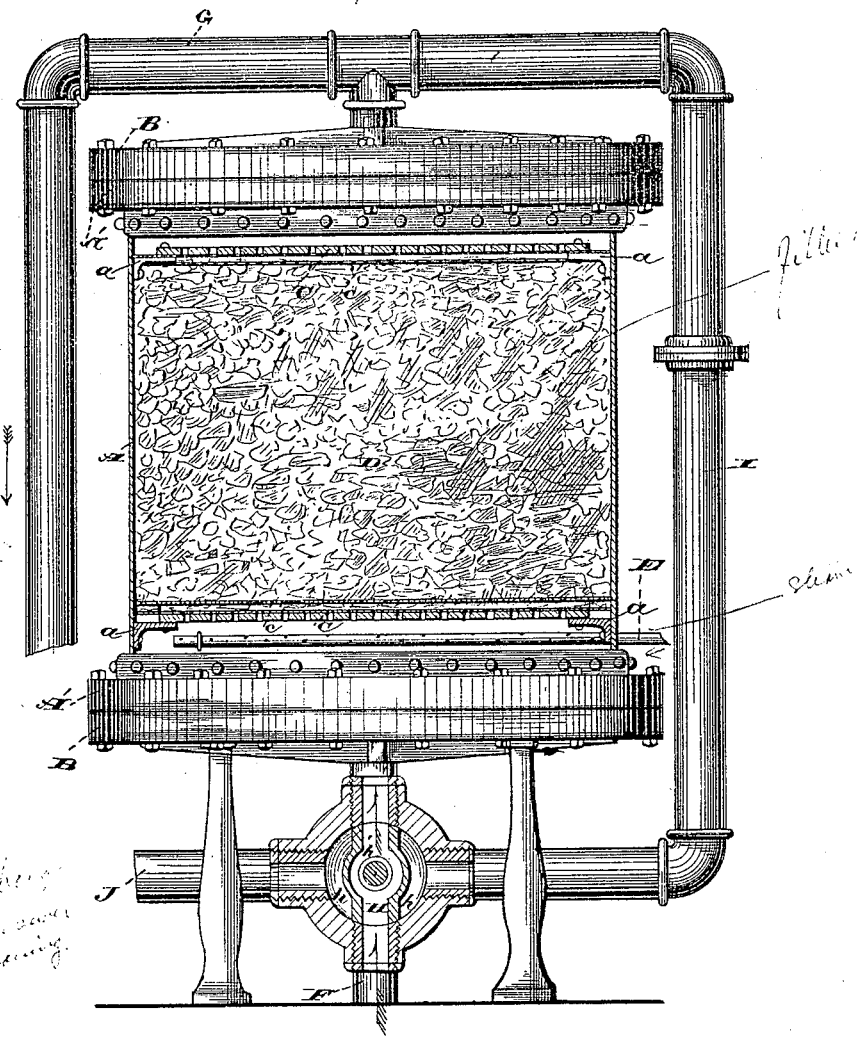
WITNESSES
Wm. H. Monroe.
Geo. W. King
INVENTOR
Philip Brickman
by Liggett and Liggett
Attorneys

FEED-WATER HEATER AND FILTER.

SPECIFICATION forming part of Letters Patent No. 329,265, dated October 27, 1885.

Application filed July 31, 1885. Serial No. 173,141. (No model.)

*To all whom it may concern:*

Be it known that I, PHILIP BRICKMAN, of Cleveland, in the county of Cuyahoga and State of Ohio, have invented certain new and useful improvements in a Combined Feed-Water Heater and Filter; and I do hereby declare the following to be a full, clear, and exact description of the invention, such as will enable others skilled in the art to which it pertains to make and use the same.

My invention relates to improvements in combined feed-water filters and heaters in which the water, on first entering the apparatus, is heated by live steam to precipitate such sediment as can be separated in this manner, after which the heated water is passed through a body of filtering material and through screens, and passed in its purified condition to the boiler. Suitable valves and pipes are provided to reverse the current of water through the apparatus, to wash out any accumulation of sediment and filth, and discharge the same through a waste-pipe, after which, by again reversing the valves, the water is returned to its normal course through the apparatus.

In the accompanying drawings, Figure 1 is a side elevation, partly in section, of my improved filter and heater and connected pipes and valves.

The container in which the heating and filtering is done may be made in a variety of ways, but a preferable construction is that illustrated in the drawings, in which, A represents an upright hollow cylinder, made, usually, of boiler-iron with flanges A', to which are respectively bolted the heads B and B', that are usually of cast-iron. The structure is usually elevated on legs, as shown, for convenience. Inside the cylinder the annular flanges $a$ support, respectively, the perforated plates C, that in turn support the screens $c$, a plate and screen being separated an inch or more by suitable legs. Between the two sets of plates and screens the space is filled with filtering material, D, preferably coke reduced in size corresponding with the ordinary nut coal.

E is a steam-pipe connected with the boiler and entering the cylinder below the lower plate C. Inside the cylinder this steam-pipe is perforated with numerous small holes.

F is the supply-pipe leading from the pump, and G the feed-pipe leading to the boiler.

H is a "four-way" valve, with side pipes, I and J, connected therewith, the former connecting above with the pipe G, and the latter, being a waste-pipe, may lead anywhere that is convenient to discharge the sediment from the filter. When the valve is in the position shown in Fig. 1, the passage from the pipe F is direct through the valve into the bottom of the heater. The pipe G, somewhere between the heater and boiler, is provided in the usual manner with a check-valve. The water, on first entering the cylinder A, is heated by live steam admitted through the perforations of the pipe E. The water next passes through the lower plate and screen, and from thence through the coke, and next through the upper screen and plate, and is discharged through the pipe G, and conducted to the boiler. After a time, longer or shorter, according to the condition of the water on entering the cylinder, a quantity of sediment will accumulate on the head B', and other refuse not precipitated will lodge in the filtering material to such an extent that it is necessary to remove the same. To do this the valve H is reversed—that is, turned to the position shown in Fig. 2. This opens a passage-way from the cylinder through the discharge-pipe J, and at the same time conducts the water from the pump through the pipe I, to the top of the cylinder. The water passing through the filtering material washes out the matter lodged therein. The upper surface of the head B' is concaved, so that the sediment lodged on the head and the refuse from the filtering-chamber will, during the operation of cleansing the filter, gravitate to the central opening in the head and be discharged. The check-valve (not shown) in the pipe G prevents the return of water from the boiler. This washing-out or cleansing process requires but a few moments, when, by again reversing the valve—that is, returning it to the position shown in Fig. 1—the filtering apparatus resumes its normal functions, and the supply of the boiler is continued. The valve H is substantially a plug-valve, with chamber $b$ along the sides, in addition to the passage-way $h'$ through the center of the valve. The esssential features of this valve are shown in section in Figs. 1 and 2. The valve is of course provided with a suitable handle (not shown) by means of which the valve is reversed without trouble.

What I claim is—

1. In a combined feed-water heater and filter, the combination, with an upright container, and a filtering-chamber and a heating-chamber arranged therein, the former located above the latter, of pipes and a valve arranged to feed upward through the container in supplying the boiler, and by reversing the valve to pass water downward through the container to cleanse the same, substantially as set forth.

2. In a combined feed-water heater and filter, the combination, with an upright container having a concaved bottom, a heating-chamber next above the said bottom, a perforated pipe in said heating-chamber for admitting live steam, and a filtering-chamber, arranged above the heating-chamber, of pipes and valves arranged to pass water upward or downward through the container by reversing the valve, substantially as set forth.

In testimony whereof I sign this specification, in the presence of two witnesses, this 24th day of July, 1885.

PHILIP BRICKMAN.

Witnesses:
CHAS. H. DORER,
ALBERT E. LYNCH.